US011074900B2

(12) United States Patent
Chaudhry

(10) Patent No.: US 11,074,900 B2
(45) Date of Patent: Jul. 27, 2021

(54) INSULATING SPHERES AND METHOD OF MANUFACTURING SAME

(71) Applicant: Afzal Muhammad Chaudhry, Somerset, NJ (US)

(72) Inventor: Afzal Muhammad Chaudhry, Somerset, NJ (US)

(*) Notice: Subject to any disclaimer, the term of this patent is extended or adjusted under 35 U.S.C. 154(b) by 124 days.

(21) Appl. No.: 16/024,877

(22) Filed: Jul. 1, 2018

(65) Prior Publication Data

US 2018/0308463 A1    Oct. 25, 2018

Related U.S. Application Data

(63) Continuation-in-part of application No. 14/176,142, filed on Feb. 9, 2014, now abandoned.

(51) Int. Cl.

| | |
|---|---|
| *G10K 11/162* | (2006.01) |
| *B32B 3/20* | (2006.01) |
| *B32B 13/08* | (2006.01) |
| *B32B 13/04* | (2006.01) |
| *B32B 7/12* | (2006.01) |
| *E04C 2/288* | (2006.01) |
| *E04B 1/90* | (2006.01) |
| *G10K 11/165* | (2006.01) |

(Continued)

(52) U.S. Cl.
CPC ............. *G10K 11/162* (2013.01); *B32B 3/20* (2013.01); *B32B 7/12* (2013.01); *B32B 13/047* (2013.01); *B32B 13/08* (2013.01); *E04B 1/88* (2013.01); *E04B 1/90* (2013.01); *E04C 2/2885* (2013.01); *G10K 11/165* (2013.01); *B28B 19/0092* (2013.01); *B32B 2250/03* (2013.01); *B32B 2250/40* (2013.01); *B32B 2264/0257* (2013.01); *B32B 2307/102* (2013.01); *B32B 2307/304* (2013.01); *B32B 2607/00* (2013.01); *E04B 1/803* (2013.01); *E04B 1/8404* (2013.01); *E04B 2001/7691* (2013.01);

(Continued)

(58) Field of Classification Search
CPC ... E04B 1/88; E04B 1/90; E04B 1/803; E04B 1/8404; E04B 2001/7691; E04B 2001/8414; G10K 11/162; G10K 11/165; B32B 3/20; B32B 7/12; B32B 13/047; B32B 2250/40; B32B 2307/206; E04C 2/2885; E04C 2/296; Y02B 80/10; Y10T 428/131; Y10T 428/1372; Y10T 428/2982; Y10T 428/2991; Y10T 428/2996
USPC .............. 426/403; 428/403; 52/406.1–406.3, 52/506.01, 784.15, 794.1
See application file for complete search history.

(56) References Cited

U.S. PATENT DOCUMENTS

| | | | | | |
|---|---|---|---|---|---|
| 2,797,201 | A | * | 6/1957 | Veatch | C03C 11/002 521/57 |
| 3,331,729 | A | * | 7/1967 | Danielson | C09J 133/06 428/40.4 |
| 3,365,315 | A | * | 1/1968 | Beck | C03B 19/107 501/33 |
| 3,769,770 | A | * | 11/1973 | Deschamps | E04B 1/76 52/404.1 |

(Continued)

*Primary Examiner* — William V Gilbert
(74) *Attorney, Agent, or Firm* — US IP Attorneys, P.C.; Timothy Marc Shropshire

(57) ABSTRACT

The present invention is a thermal and acoustic insulating sphere that has an evacuated hollow interior. The spheres are constructed of insulating materials, and the inner and outer surfaces of each sphere have highly reflective coatings evenly applied to them. The coatings applied to the inner and outer surfaces reduce the transmission of heat by conduction, convection, and radiation. Additionally, the spheres provide superior acoustic insulation due to the inability of (Continued)

sound to travel through the interior vacuum. The spheres can be used to produce insulating materials, for example, by embedding or positioning them within or between other materials, to provide thermal and acoustic insulation.

11 Claims, 3 Drawing Sheets

(51) Int. Cl.
   *E04B 1/88*   (2006.01)
   *B28B 19/00*  (2006.01)
   *E04B 1/80*   (2006.01)
   *E04B 1/76*   (2006.01)
   *E04B 1/84*   (2006.01)

(52) U.S. Cl.
   CPC ..... *E04B 2001/8414* (2013.01); *Y02A 30/242* (2018.01); *Y02B 80/10* (2013.01); *Y10T 428/131* (2015.01); *Y10T 428/1317* (2015.01); *Y10T 428/1372* (2015.01); *Y10T 428/2982* (2015.01)

(56) References Cited

U.S. PATENT DOCUMENTS

| | | | | |
|---|---|---|---|---|
| 4,303,061 A | * | 12/1981 | Torobin | B01J 20/28 126/708 |
| 4,303,603 A | * | 12/1981 | Torobin | B01J 13/22 264/69 |
| 4,618,517 A | * | 10/1986 | Simko, Jr. | B32B 3/20 428/34.4 |
| 4,671,994 A | * | 6/1987 | Cochran, Jr. | B22F 1/0051 376/152 |
| 5,500,287 A | * | 3/1996 | Henderson | B01J 13/02 428/336 |
| 2002/0028857 A1 | * | 3/2002 | Holy | C08L 3/12 523/124 |
| 2012/0135138 A1 | * | 5/2012 | Lipovetskaya | G02B 26/026 427/162 |
| 2014/0138274 A1 | * | 5/2014 | Smith | B65D 55/026 206/459.1 |

* cited by examiner

INSULATING SPHERES AND METHOD OF MANUFACTURING SAME

CROSS-REFERENCE TO RELATED APPLICATION(S)

The present application claims priority to U.S. Nonprovisional Utility patent application Ser. No. 14/176,142 filed on Feb. 9, 2014, entitled "HEAT AND SOUND INSULATION BALL (HASIB)" the entire disclosure of which is incorporated by reference herein.

BACKGROUND OF THE INVENTION

1. Field of Invention

The present invention relates to thermal and acoustic insulating material. More particularly, the present invention relates to the field of insulated spheres for creating a thermal and acoustic barrier for reducing or eliminating the transmission of heat and sound.

2. Description of Related Art

Efforts to improve thermal insulating materials have been made. One such insulating material utilizes packed glass microspheres coated with a reflective material and having a vacuum in the intersticial area between microspheres. The outer reflective coating is intended to minimize heat transfer by radiation; the vacuum in the intersticial area reduces heat transfer by gas conduction. Although insulation materials made from these types of microspheres possess distinct advantages over commercially available materials, they also have several inherent disadvantages. For example, it has been found difficult, if not impossible, in many applications to maintain the vacuum in the intersticial area. This dramatically increases energy losses induced by gas conduction. It has also been found to be very difficult to deposit a relatively thin film of reflective material on the outer surface of the microspheres. Even where this has been accomplished, the coating wears at the area of point to point contact between microspheres. The point to point contact, in and of itself, increases heat transfer by solid conduction and the wearing of the reflective material necessarily increases heat transfer by radiation. Moreover, the known methods of producing hollow glass microspheres, e.g., U.S. Pat. Nos. 2,797,201 and 3,365,315, etc., have not been successful in producing products of relatively uniform size or uniform thin walls. This makes it difficult to produce insulation materials of controlled and predictable characteristics and quality.

Another packed glass microsphere insulating material is taught in U.S. Pat. No. 5,500,287. In that invention, hollow microspheres each have a hollow interior evacuated of gases to a predetermined pressure. A reflective material layer coats the exterior of each microsphere and, optionally, an outer layer of a protective material is applied over the reflective material layer. Permeant gases are dissolved into glass or plastic frit particles prior to heating of the frit particles to form hollow microspheres having the permeant gases contained therein. The permeant gases are subsequently outpermeated in a non-permeant gas atmosphere to substantially evacuate the interior of each microsphere. The exterior layers of reflective material and protective material are then coated about each evacuated microsphere.

Another packed glass microsphere insulating material is taught in U.S. Pat. No. 4,303,061. In that invention, thin walled hollow microspheres contain a vacuum and a reflective coating on the interior surface. The microsphere is formed from molten glass and the vacuum and reflective coating are put in place at the time the microsphere is made. According to the patent, all of these operations are conducted at the melting temperature of glass, about 2,000° F., an extremely high and difficult environment in which to carry out such procedures. To further compound this difficulty, glass evolves water at these temperatures. The water, in turn, is reduced by the metals comprising the reflective coating to form hydrogen. Since hydrogen is an excellent conductor of heat, this has a deleterious effect on the insulation property of the microspheres. Equally as important, at these temperatures it is extremely difficult to evenly deposit a reflective coating of the desired thickness on the interior surface of the microsphere.

A need thus exists in the art for a thermal and acoustic barrier which is not subject to the deficiencies of either the present commercially available materials or the packed glass microsphere technology, which can be readily manufactured with predictable and controlled characteristics and quality, and which can be mass produced at prices attractive to the construction industry.

SUMMARY OF THE INVENTION

The present invention is a hollow sphere made from insulating materials, such as fiber-reinforced plastic and glass. Insulating and highly reflective coatings are evenly applied to the inner and outer surfaces of the sphere. Additionally, there is vacuum inside the sphere. Due to the sphere's unique qualities, i.e., the inner and outer coatings and the interior vacuum, the present sphere provides superior thermal insulation by reducing the transmission of heat by processes including conduction, convection and radiation, thus saving energy in heating and cooling processes. Additionally, the present invention provides superior acoustic insulation due to the inability of sound to travel through the interior vacuum.

In an embodiment, each hollow insulating sphere includes two mating, hollowed-out hemispheres joined to one another by a joinder means, such as an epoxy or a weld, disposed between the hemispheres. In an embodiment, the hemispheres are constructed of an insulating material. Additionally, the inner and outer surfaces of the hemispheres include insulating and highly reflective coatings that uniformly cover all surfaces of the hemispheres. To further reduce the transmission of heat and sound through the sphere, the interior of the sphere is evacuated.

The insulating spheres can be used in an insulation system in which the spheres are bound between retaining sheets. For example, the spheres may be integrated into a mixture of gypsum, with or without additives, that is then sandwiched between sheets of paper to form an insulating drywall. As another example, the spheres may be bound between sheets of plastic or other material using an adhesive.

A method of manufacturing the insulating spheres includes the steps of: constructing the hemispheres; coating the inner and outer surfaces of each hemisphere; and joining the hemispheres to form a hollow sphere.

In an embodiment, the hemispheres are made using a plastic molding technique.

In an embodiment, the first hemisphere is joined to the second hemisphere in a vacuum chamber that is connected to a high vacuum pumping system to ensure that the interior of the sphere is evacuated upon joinder.

In another embodiment, following joinder of the hemispheres, the method further includes the steps of: drilling a hole through a wall of the sphere; placing the sphere in a vacuum chamber that is connected to a high vacuum pumping system; evacuating the sphere through the hole; and closing the hole by a weld using a laser or an electron beam.

In an embodiment, a method of coating the inner and outer surfaces of the hemispheres includes the steps of: placing the hemispheres into a vacuum chamber connected to a high vacuum pumping system; and evaporating a source material, such as polyethylene, into the vacuum chamber. The source material vapor condensate adheres to the surfaces of the hemispheres to create a reflective coating on all exposed surfaces of the hemispheres.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
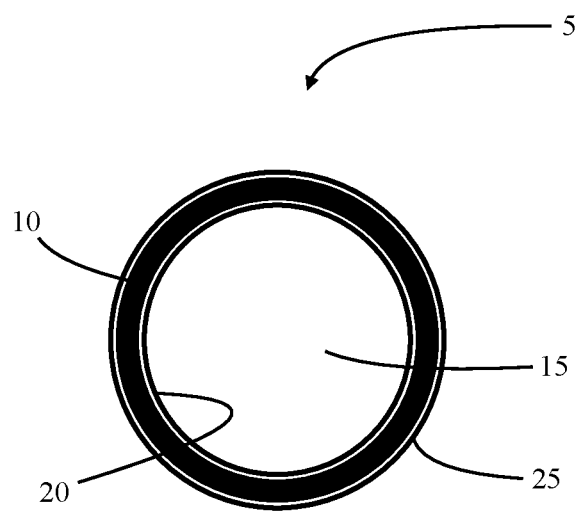
FIG. 1 is cross-sectional view of an insulating sphere, according to an embodiment of the present invention.

Preferred embodiments of the present invention and their advantages may be understood by referring to FIGS. 1-4, wherein like reference numerals refer to like elements.

FIG. 1 shows a cross-sectional view of the insulating sphere 5. The sphere 5 is constructed of an insulating material 10, such as fiber-reinforced plastic or glass. The sphere 5 has a hollow, evacuated interior 15. The inner surface 20 and outer surface 25 of the sphere 5 are evenly coated with an insulating and highly reflective material.

Figure 2:
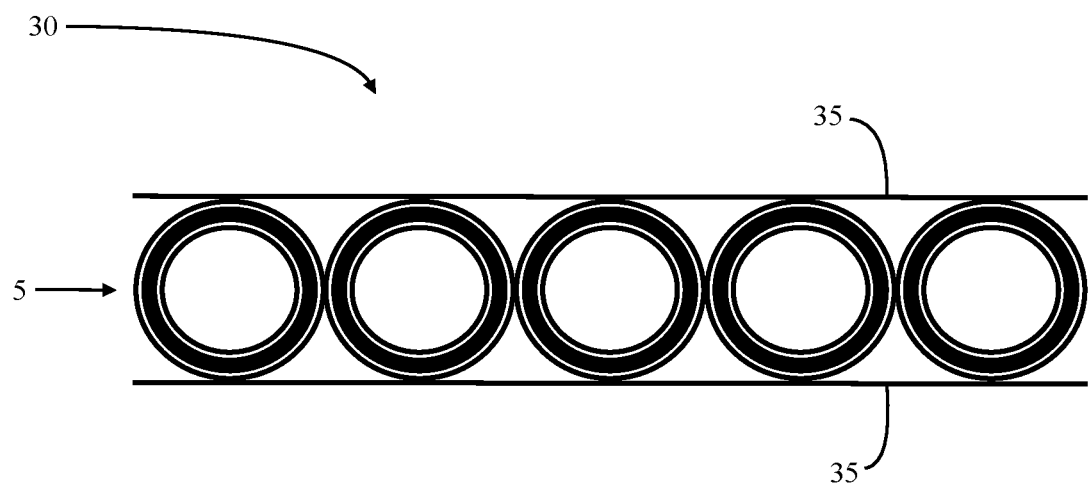
FIG. 2 is a cross-sectional view of an insulation material using the insulating spheres, according to an embodiment of the present invention.
Figure 3:
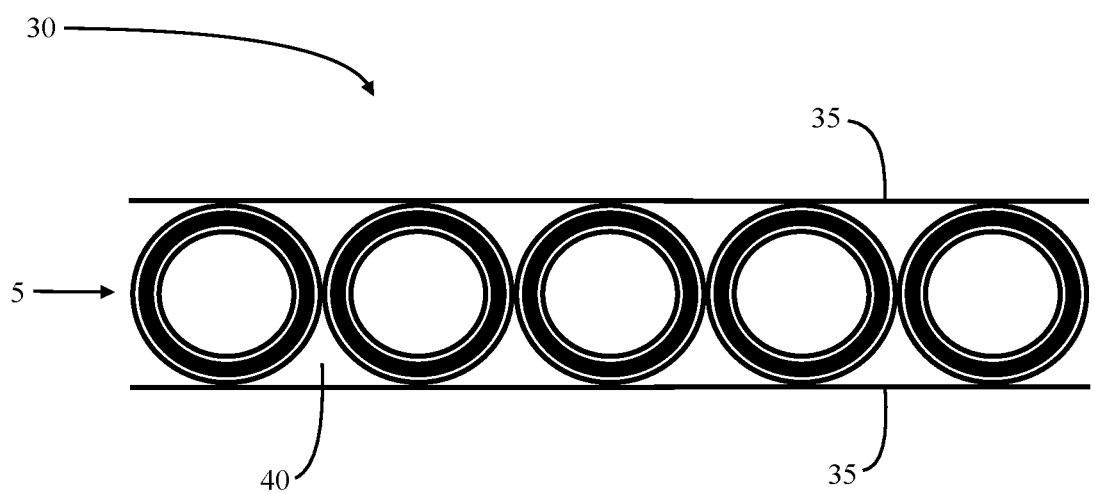
FIG. 3 is a cross-sectional view of an insulation material using the insulating spheres, according to an embodiment of the present invention.

FIGS. 2-3 show cross-sectional views of insulating materials 30 containing the spheres 5. In an embodiment, as shown in FIG. 2, the spheres 5 are glued, or otherwise affixed, between two sheets 35 of material such as plastic or paper, to form the insulating material 30. In another embodiment, as shown in FIG. 3, the spheres 5 are embedded in a matrix 40, such as gypsum, between two sheets 35 of material to form the insulating material 30.

Method of Manufacture

Figure 4:
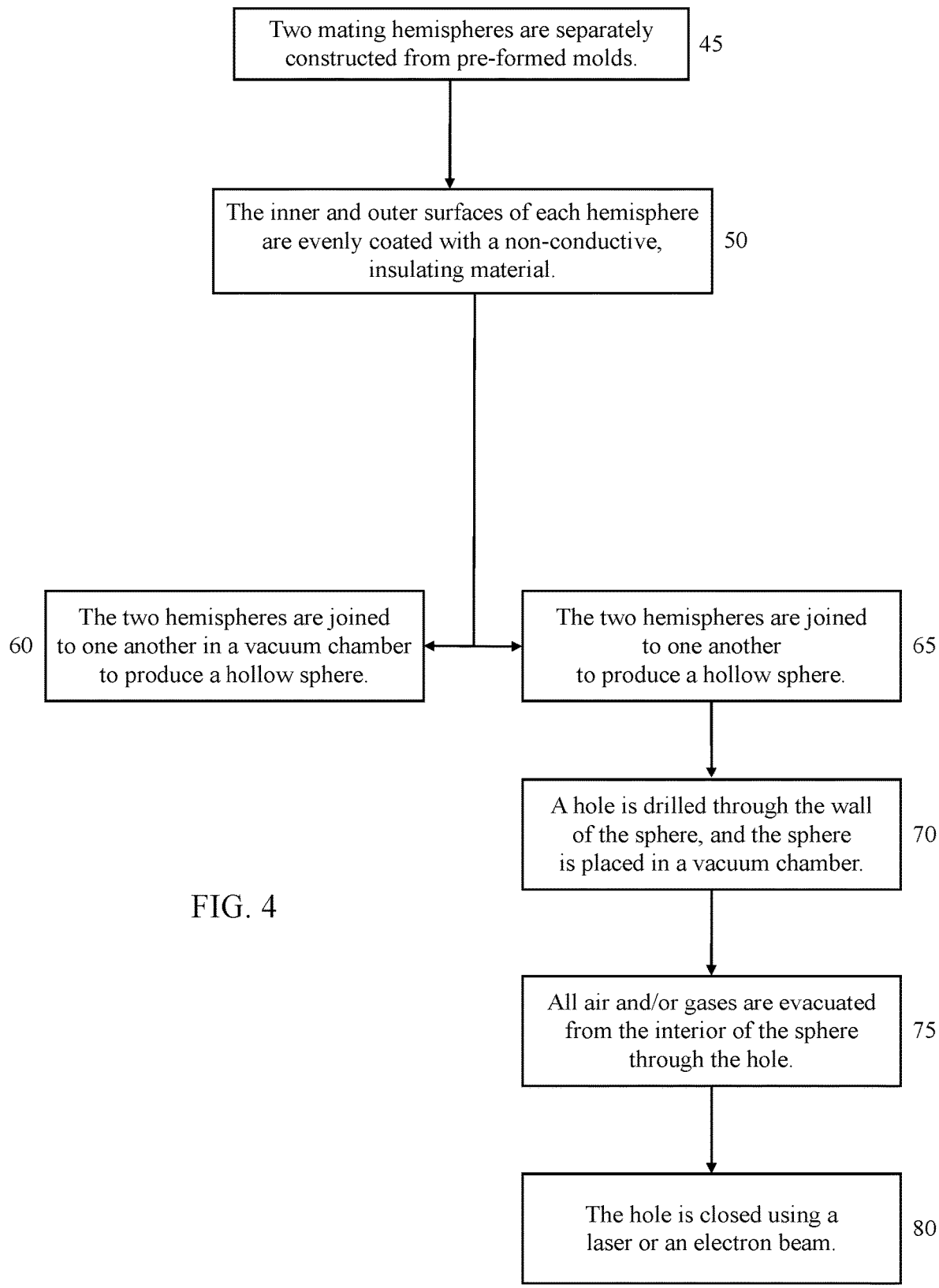
FIG. 4 is a flow chart that details a method of manufacturing the insulating spheres, according to an embodiment of the present invention.

FIG. 4 shows a flow chart that illustrates a method of manufacturing the spheres.

At step 45, two mating hemispheres are separately constructed using a molding technique (not shown). For example, the material(s) used to construct the hemispheres can be poured, or otherwise placed, in molds, whereby the material(s) is/are allowed to set and form the hemispheres. By using a molding technique, the dimensions of each hemisphere can be controlled such that the hemispheres can be mass produced with predictable and controlled characteristics and quality.

At step 50, the entirety of the inner and outer surfaces of each hemisphere are evenly coated with an insulating material. In an embodiment, the coatings are produced by evaporating a source material, such as polyethylene, inside a vacuum chamber which is connected to a high vacuum pumping system. The material vapor condensate adheres to the hemispheres within the vacuum chamber to create a reflective coating on all exposed surfaces of the hemispheres.

At step 60, the two hemispheres are joined to one another inside a vacuum chamber that is connected to a high vacuum pumping system to produce a hollow evacuated sphere. In an embodiment, the hemispheres are fused together by a welding technique using a laser or an electron beam. In another embodiment, the hemispheres are joined together using, for example, an epoxy or other adhesive.

Alternatively, at step 65, joinder of the two hemispheres takes place outside of the vacuum chamber. In this embodiment, at step 70, a hole is drilled through the wall of the sphere, and the sphere is placed inside a vacuum chamber that is connected to a high vacuum pumping system. At step 75, the interior of the sphere is evacuated through the hole. At step 80, the hole is closed by a welding technique using a laser or an electron beam.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A hollow insulating sphere comprising:
    a. a first hemisphere;
    b. a second hemisphere; and
    c. a joinder means disposed between the first hemisphere and the second hemisphere, wherein the joinder means is selected from the group consisting of an epoxy and a weld,
    wherein an inner surface and an outer surface of each of the first hemisphere and the second hemisphere include an insulating and reflective coating, wherein the coating uniformly covers all surfaces of the first hemisphere and the second hemisphere, and wherein an interior of the sphere is under a vacuum condition.

2. The sphere of claim 1, wherein the first hemisphere and the second hemisphere are constructed of an insulating material.

3. An insulation system comprising:
    a. a plurality of hollow insulating spheres, each sphere comprising:
        i. a first hemisphere having an inner surface and an outer surface;
        ii. a second hemisphere having an inner surface and an outer surface;
        iii. a joinder means disposed between the first hemisphere and the second hemisphere, wherein the joinder means is selected from the group consisting of an epoxy and a weld;
        iv. a first insulating and reflective coating on the inner surface of the first hemisphere;

v. a second insulating and reflective coating on the outer surface of the first hemisphere;
vi. a third insulating and reflective coating on the inner surface of the second hemisphere; and
vii. a fourth insulating and reflective coating on the outer surface of the second hemisphere, wherein the first hemisphere and the second hemisphere are made of an insulating material, and wherein an internal space of the sphere is under a vacuum condition;
b. a plurality of retaining sheets; and
c. a binding material, wherein the insulating spheres are bound between the retaining sheets by the binding material.

4. The system of claim 3, wherein the retaining sheets are constructed of paper, and wherein the binding material is gypsum.

5. The system of claim 3, wherein the retaining sheets are constructed of plastic, and wherein the binding material is an adhesive.

6. A method of manufacturing a hollow insulating sphere, the sphere comprising:
a. a first hemisphere;
b. a second hemisphere; and
c. a joinder means disposed between the first hemisphere and the second hemisphere, wherein the joinder means is selected from the group consisting of an epoxy and a weld,
wherein an inner surface and an outer surface of each of the first hemisphere and the second hemisphere include an insulating and reflective coating, wherein the coating uniformly covers all surfaces of the first hemisphere and the second hemisphere, and wherein an interior of the sphere is under a vacuum condition,
wherein the method comprises the steps of:
a. making the first hemisphere and the second hemisphere;
b. coating the inner surface and the outer surface of each of the first hemisphere and the second hemisphere; and
c. joining the first hemisphere to the second hemisphere to form the sphere,
wherein the interior of the sphere is evacuated upon or following joinder of the first hemisphere and the second hemisphere.

7. The method of claim 6, wherein a mold is used to make the first hemisphere and the second hemisphere.

8. The method of claim 6, wherein the first hemisphere is joined to the second hemisphere inside a vacuum chamber.

9. The method of claim 6, further comprising the steps of:
a. drilling a hole through a wall of the sphere;
b. placing the sphere inside a vacuum chamber;
c. evacuating the interior of the sphere through the hole; and
d. closing the hole by welding with a laser or an electron beam.

10. The method of claim 6, wherein the step of coating the inner surfaces and outer surfaces comprises the steps of:
a. placing the first hemisphere and the second hemisphere inside a vacuum chamber; and
b. evaporating a source material into the vacuum chamber, wherein a material vapor condensate adheres to the inner surfaces and the outer surfaces of each of the first hemisphere and the second hemisphere to create the reflective, coating on all exposed surfaces of the first hemisphere and the second hemisphere.

11. The method of claim 10, wherein the source material is polyethylene.

* * * * *